United States Patent [19]
Maly-Schreiber et al.

[11] Patent Number: 5,980,787
[45] Date of Patent: Nov. 9, 1999

[54] PROTECTIVE ELEMENT FOR AN ELECTRO-CHEMICAL ACCUMULATOR AND PROCESS FOR ITS FABRICATION

[75] Inventors: Martha Maly-Schreiber; Arnold van Zyl, both of Ulm; Josef Ritter, München; Reinhold Hilpert, Moorenweis, all of Germany

[73] Assignee: DaimlerChrysler AG, Japan

[21] Appl. No.: 09/108,964

[22] Filed: Jul. 2, 1998

Related U.S. Application Data

[63] Continuation of application No. 08/616,989, Mar. 14, 1996, abandoned.

[30]    Foreign Application Priority Data

Mar. 14, 1995  [DE]  Germany ........................... 195 09 075

[51] Int. Cl.⁶ ............................... H01B 1/08; H01C 7/10; C01G 1/02
[52] U.S. Cl. ......................... 252/518.1; 338/20; 423/101; 423/DIG. 14
[58] Field of Search .............................. 252/518.1, 519.2, 252/519.21, 519.51; 423/100, 101, 102, 104, 105, 593, 622, DIG. 14; 338/13, 20

[56]              References Cited

U.S. PATENT DOCUMENTS

| | | | |
|---|---|---|---|
| 2,624,033 | 12/1952 | Jacquier | 429/7 |
| 3,379,570 | 4/1968 | Berger et al. | 429/19 |
| 3,821,686 | 6/1974 | Harnden, Jr. | 338/20 |
| 3,904,434 | 9/1975 | Sckido et al. | 429/59 |
| 4,879,188 | 11/1989 | Meinhold et al. | 427/7 |
| 4,911,981 | 3/1990 | Schnur et al. . | |
| 5,039,452 | 8/1991 | Thompson et al. | 252/518 |
| 5,073,302 | 12/1991 | Igari et al. | 252/518 |
| 5,248,452 | 9/1993 | Imai et al. | 252/518 |
| 5,260,848 | 11/1993 | Childers | 361/127 |
| 5,419,977 | 5/1995 | Weiss et al. | 429/7 |
| 5,509,558 | 4/1996 | Imai et al. | 338/21 |
| 5,549,981 | 8/1996 | Maly-Schrieber et al. | 429/7 |
| 5,811,207 | 9/1998 | Maly-Schreiber et al. | 429/213 |

FOREIGN PATENT DOCUMENTS

| | | |
|---|---|---|
| 0 050 091 | 4/1982 | European Pat. Off. . |
| 0419664 | 4/1991 | European Pat. Off. . |

(List continued on next page.)

OTHER PUBLICATIONS

"Materials Fabrication via Polymerizable Self–Organized Membranes: An Overview", NanoStructured Materials, Feb. 5, 1995, A. Singh et al.
"Nanostructured Constituents of ZnO–Based VAristors Prepared by Mechanical Attrition", NanoStructured Materials, Mar./Apr. 1994, Z. Brankovic et al.
European Search Report, May 4, 1997.
Ivers–Tiffee et al "Characterization of Varistor–Type Raw Materials ... " Am. Ceram. Soc. Bull. 66(9) pp. 1384–1388. (Abstract Only), 1987.

*Primary Examiner*—Mark Kopec
*Attorney, Agent, or Firm*—Evenson, McKeown, Edwards & Lenahan, P.L.L.C.

[57]          ABSTRACT

A protective element for an electrochemical accumulator is made of granular varistor material, the mean diameter of the grains of the varistor material being less than 1 μm, in particular less than 250 nm and, for more than 60% of the grains of the varistor material, the grain size deviating by at most 40% from its statistical average. For the preparation of such grains, a dispersion is made up to form biochemical hollow bodies which have an internal diameter in accordance with the above requirements. The dispersion is admixed with salts which dissolve in the dispersion with the formation of intermediate ions of a substance forming an intermediate for a varistor material, the intermediate ion of a substance forming an intermediate for a varistor material being an intermediate ion of an element required for the varistor material or of a corresponding compound. The intermediate ions of a substance forming an intermediate for a varistor material are positioned in the enclosed void of the hollow bodies, being used to form the grains of the varistor material or an intermediate of corresponding shape, which are released by removing the sheath of the hollow bodies.

11 Claims, 2 Drawing Sheets

FOREIGN PATENT DOCUMENTS

| | | |
|---|---|---|
| 0674353 | 9/1995 | European Pat. Off. . |
| 1 046 153 | 12/1958 | Germany . |
| 25 26 137 | 12/1976 | Germany . |
| 34 00 815 | 9/1985 | Germany . |
| 36 19 620 | 12/1987 | Germany . |
| 37 21 754 | 1/1989 | Germany . |
| 38 26 356 | 2/1990 | Germany . |
| 42 29 437 | 11/1993 | Germany . |
| 43 20 836 | 1/1995 | Germany . |
| 44 09 268 C1 | 6/1995 | Germany . |
| 44 09 628 | 6/1995 | Germany . |
| 5054911 | 5/1993 | Japan . |
| PCT/US95/ 14282 | 11/1995 | WIPO . |

PROTECTIVE ELEMENT FOR AN ELECTRO-CHEMICAL ACCUMULATOR AND PROCESS FOR ITS FABRICATION

This application is a continuation of application Ser. No. 08/616,989, filed Mar. 14, 1996 now abandoned.

BACKGROUND AND SUMMARY OF THE INVENTION

The invention relates to a protective element for an electrochemical accumulator device comprising at least one storage cell having first and second electrodes separated by an electrolyte, and to a process for making such a protective element.

German patent document 44 09 268.7-45 discloses an electrochemical accumulator having a plurality of serially interconnected individual cells, each of which has two spatially separated electrodes, with at least one electrolyte and protective element being disposed therebetween. The protective element made of varistor material serves, on the one hand, to maintain the gap between the electrodes and, on the other hand, to provide against an overcharge of the cell.

The varistor material has a nonlinear resistance, acting as an insulator below a specific voltage and becoming conductive above said voltage. That is, similar to a Zener diode, the protective element possesses a breakdown voltage at which the change from insulator to conductor characteristics occurs. Advantageously, the critical voltage in this case is lower than or equal to the overcharging voltage or destructive voltage beyond which an element of an individual cell, generally the electrolyte, suffers irreparable damage. The use of a varistor material as a protective element is critical, however, owing to the difficulty of setting the breakdown voltage, since the latter generally is a function of the layer thickness of the varistor material. The layer thickness of the protective element in turn, however, enters directly into the size of the individual cell, and as a result the overall volume of designs protected with varistor materials is considerable.

The scientific article "Synthesis of Submicrometer Crystals of Aluminum Oxide by Aqueous Intravesicular Precipitation" in Journal of Colloid and Interface Science, Vol. 135, No. 2, Mar. 15th, 1990, pages 531–538, discloses a method for preparing aluminum oxide grains which have a mean diameter of approximately 10–20 nm. To prepare such grains, an aluminum salt solution is enclosed in phospholipid vesicles, the Al ions in the outside medium are removed, and by means of a marked increase in the pH, precipitation of aluminum oxide is triggered in the voids formed by the vesicles. After the formation of the desired substance, the vesicles are removed and grains in the desired order of magnitude have been obtained. In addition, other biochemical hollow bodies such as, e.g. micelles and ferritin, have been described as matrices for preparing such vesicles.

U.S. Pat. No. 3,821,686 and European patent document 50 091 disclose protective elements made of granular varistor material, which are disposed directly between two conductors and may therefore, in particular cases, have to be designed to be very small.

German patent document 37 21 754 A1 discloses a protective element for an electrochemical accumulator comprising at least one individual cell, each individual cell having two spatially separated electrodes between which an electrolyte and a protective element consisting of varistor material is situated. The protective element comprises varistors which regularly consist of granular varistor material and which—owing to the varistor characteristics—prevent overcharging.

German patent document 42 29 437 C1 discloses an electrochemical accumulator whose electrodes are separated from one another by means of spacers.

German patent document 36 19 620 A1 discloses varistor bodies consisting of fine-grained varistor material. It further discloses the interrelationship that, owing to the more numerous grain boundaries per unit length, varistors having a smaller thickness or a smaller volume can be used.

German patent documents 43 20 836 A1, 38 26 356 A1 and 25 26 137 C2 disclose the preparation of varistor materials. These publications disclose different starting materials and different intermediates and the further processing thereof.

German patent document 43 20 836 A1 discloses, in particular, the preparation of finely particulate mixed oxide powders, whose grain size is usually below 1 $\mu$m.

German patent document 38 26 356 A1 discloses, in particular, the uniformity of the particle size within narrow limits, the particle size overall being low, below 1 $\mu$m.

German Patent 25 26 137 C2 discloses the precipitation of intermediates of varistor material.

German patent document DE-B-10 46 153 discloses granular varistor materials for which, in regions outside contiguous grain boundaries, a binder is provided which presses the grains against one another.

German patent document 34 09 815 A1 discloses ceramic materials in porous form.

The object of the present invention is to provide protective element which permits individual cells protected therewith to have as low an overall volume as possible, while enabling the fabrication of the protective element with the smallest possible manufacturing tolerances in terms of overall dimensions and of breakdown voltage.

Furthermore, it is another an object of this invention to provide a process for fabricating the protective elements according to the invention.

The object is achieved by the protective element according to the invention, which comprises granules of varistor material having a mean diameter of less than 1.0 $\mu$m, more than 60 percent of the granules having a size which varies form the average by less than 40 percent. The granular varistor material which forms the protective element is fabricated with the aid of biochemical hollow bodies, in particular of vesicles. In this manner, the grains of the varistor material can be produced below the $\mu$m region and within narrow interval limits. The grain size of the grains of the varistor material are prepared by means of an intermediate which forms the varistor material by calcination, within narrow interval limits and in a form which at least roughly corresponds to a spherical shape. Due to the resulting small grain size, it is possible, on the one hand, for the touching surface of the individual grains of the varistor material (and hence the breakdown voltage of the protective element) to be adjusted very accurately, while at the same time keeping the layer thickness of the protective elements small. Owing to the process, it is furthermore advantageously possible, by means of the biochemical hollow bodies for the grain size of the intermediate and thus of the varistor material to be varied, virtually at will, from the nm range up to the $\mu$m range. This advantageously enables the use in individual cells of different configurations in terms of layer thickness.

Other objects, advantages and novel features of the present invention will become apparent from the following detailed description of the invention when considered in conjunction with the accompanying drawings.

DETAILED DESCRIPTION OF THE DRAWINGS

Figure 1:
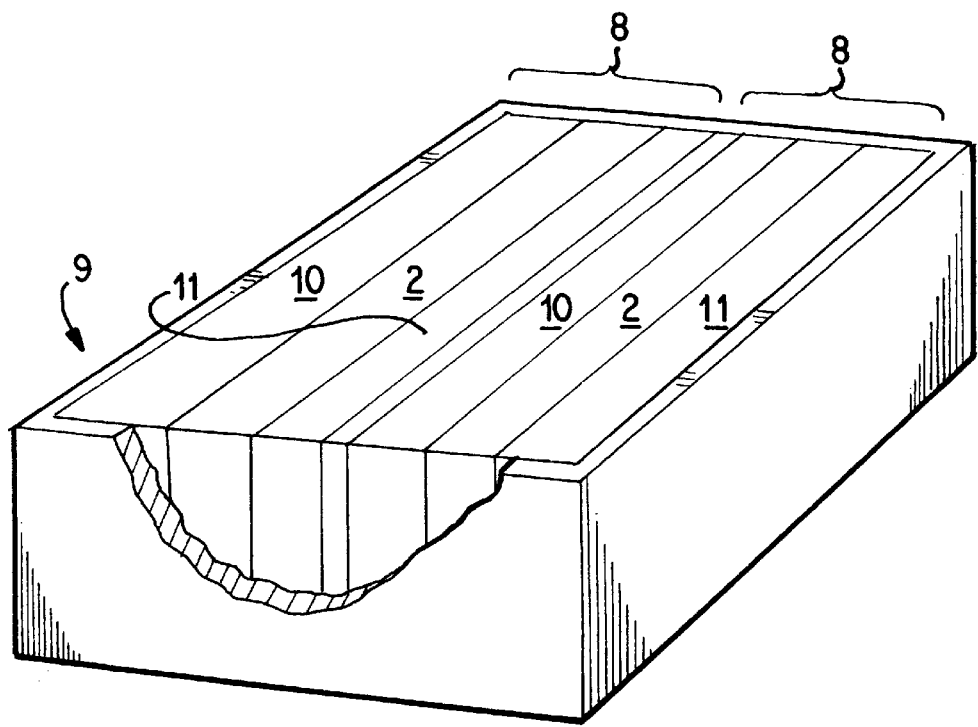
FIG. 1 shows a detail from an electrochemical accumulator comprising a plurality of individual cells.

FIG. 1 depicts individual cells 8, of plate-type construction, of an electrochemical accumulator 9, the cell being of the type that can be used, for example, in batteries, storage cells and the like. The invention is not limited to individual cells 8 of this type, but can also be applied, in a simple manner, to other batteries, for example comprising laminated or wound electrodes and the like.

The individual cell 8 according to FIG. 1 has, inter alia, two electrodes 10, 11 which are of opposite polarity and are spatially separated from one another, between which a protective element 2 is inserted. To safeguard the individual cell 8, the protective element 2 has good electrical conductivity, at least at a switching threshold which corresponds to a level no higher than a breakdown voltage or destructive voltage of an individual cell 8, so that, from the switching threshold onwards, the two electrodes 10, 11 are connected electroconductively via the protective element 2. Below the switching threshold, i.e., at operating voltage, the protective element 2 constitutes an insulator. The term switching threshold here refers to that voltage which is at most equal to the destructive voltage of the individual cell 8 and at which the resistance of the protective element 2 changes from high resistance values, i.e. from an electrically insulating state, to low-resistance values, i.e. to an electroconductive state. So as to make it possible to tap off an electrical voltage at the electrodes 10, 11 of the individual cell 8 in operation, and thus in the insulating state of the protective element 2, the electrolyte of the individual cell 8 is situated, at least in part, in the voids 12 of the porous protective element 2.

By virtue of this construction it is possible, in a simple manner, without an additional component and possibly even without an increase in weight, to achieve protection for individual cells 8 against destruction or overcharging, since the protective element 2, made from grains 1 of varistor material, has high resistance below its switching threshold and can therefore at the same time be used as a separator.

It is apparent that, in the case of the protective element 2, the adjustment of the switching threshold is of primary importance. By virtue of the invention it is now possible for the switching threshold, which was hitherto effected via the layer thickness of the protective element 2, to be established within narrow limits, with a high reproducibility and consequently low wastage.

In particular, this arrangement provides the additional advantage that, owing to the small grain size of the grains 1, the protective element 2 can be fabricated with a low thickness. Since the protective element 2, in the present design of the individual cell 8, contributes to width, this in turn leads to reduced external dimensions of an electrochemical accumulator 9. As a result, in the case of electrochemical accumulators 9 comprising a plurality of individual cells 8, a corresponding reduction can be achieved in the total width of the electrochemical accumulator 9.

Figure 2:
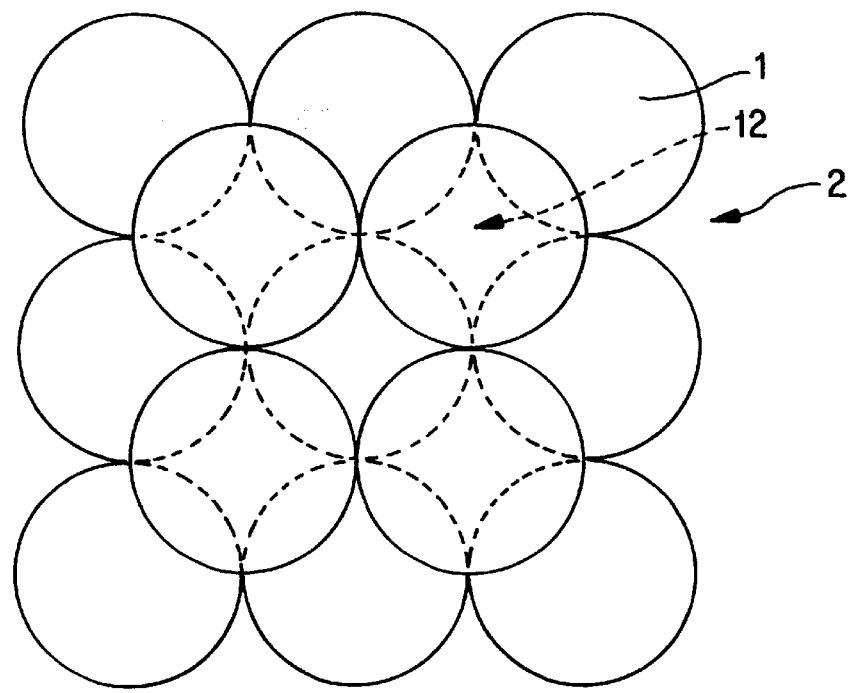
FIG. 2 shows a detailed schematic depiction of a protective element, made from grains of varistor material, of an individual cell.

FIG. 2 depicts an enlarged detail of the protective element 2 for the individual cell 8 according to FIG. 1. The protective element 2 is composed of individual grains 1 of approximately spherical shape, which are made of a varistor material and, at their contact surfaces, are bonded to one another. Bonding can be effected, for example, by sintering. Thus it is possible for elements of varying yet defined densities and porosities to be produced in a simple manner.

The mean diameter of the grains 1 made of varistor material is less than 1 $\mu$m, and preferably less than 250 nm, with at least 60% of all the grains 1 made of varistor material being situated within an interval which deviates by at most 40% from their statistical average. More beneficial is the case where the grains 1, in terms of their volume, deviate from one another by at most 10%.

Because the grains 1 are substantially spherical in shape and have roughly uniform dimensions, prior to being bonded to one another, they are able to arrange themselves in a close-packed structure, the so-called body centered cubic packing of identical spheres, as is shown, in a top view, in an idealized manner in FIG. 2 with two layers of grains 1 situated one above another.

For the protective element 2, this means that in a unit cell abstracted from crystal physics, there will always be a void 12, defined within narrow limits, and likewise a defined free surface. Consequently there will be a defined contact surface between individual grains 1, the atoms of the unit cell, which in the crystal physics model of the unit cell are postulated to be spherical, simply being replaced by the grains 1 of the varistor material, which are spherical at least in rough approximation. Thus, the microscopic structure of the protective element 2 can be represented by unit cells being lined up next to one another periodically.

The presence of such a unit cell in the structure of the protective element 2 is beneficial, inter alia, because the contact surface of the grains 1 with one another is related, in a mathematically describable way, with the switching threshold of the protective element 2 as a whole. Thus, it is possible, for a desired switching threshold and a given layer thickness of the protective element 2, to determine the size of the grains 1 arithmetically in a simple manner.

The void space 12 of such a unit cell directly enters into the amount of electrolyte, of the individual cell 8, with which the protective element 2 is charged, thereby making it possible to calculate the amount of electrolyte required for a minimum charge. Consequently, it is, for example, possible to check whether the protective element 2, which in an individual cell 8 can also be used as a separator, and is available as a storage medium for the electrolyte, has been adequately charged with electrolyte.

There follows a discussion, with reference to FIGS. 3 to 6, of the process for fabricating a protective element 2 according to the invention with the aid of vesicles as hollow bodies.

Figure 3:
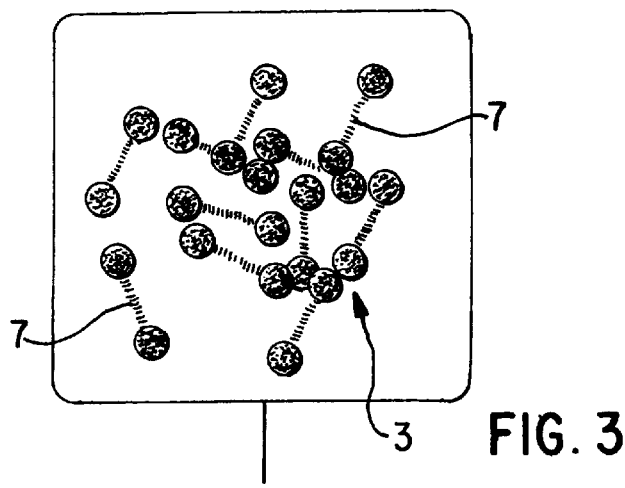
FIG. 3 shows a diagrammatic depiction of a dispersion comprising a liquid phase and lipids.

FIG. 3 depicts a dispersion 3 which, in particular, is formed from a solvent and amphiphilic, organic molecules 7, the molecules 7 being distributed randomly in the solvent. The molecules 7 employed are expediently lipids and/or proteins, in particular phospholipids. The pH of the dispersion may be adjusted to a pH different from 7. As much of a salt is dissolved in the solvent (which represents the liquid phase of the dispersion 3) as is required for optimal formation of the vesicles 5 and for preparing the desired particles under the particular conditions. The salt concentration in this case is, in particular, in the range from 0.1 M up to saturation. The salt used is a salt which contains the intermediate ion for the substance forming the varistor material as a cation. The intermediate ion required to form the varistor material may be an element or a corresponding ionized substance or compound.

Figure 4:
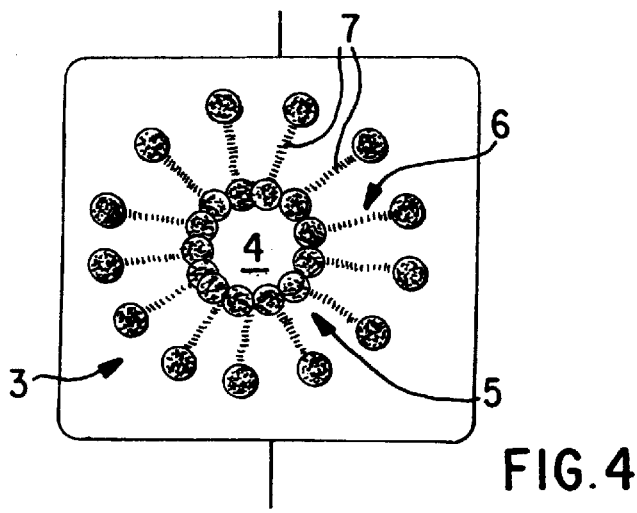
FIG. 4 shows the dispersion according to FIG. 3 with a vesicle formed from the lipids.
Figure 5:
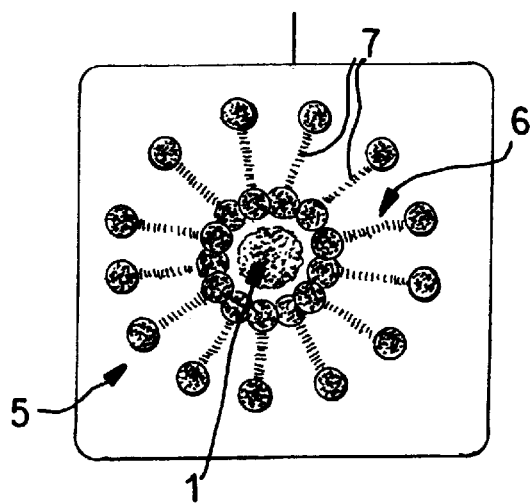
FIG. 5 shows the vesicle according to FIG. 4 with a grain made of varistor material located in the interior thereof.
Figure 6:
FIG. 6 shows a grain where the sheath of the vesicle according to FIG. 5 has been removed.

If the salt-containing dispersion 3 is exposed, as shown in FIG. 4, to relatively high-intensity ultrasound vibration, the molecules 7 give rise to spherical vesicles 5 which are bounded by a membrane or sheath 6. The sheath 6, is formed from the molecules 7. Within the sheath 6 the vesicles 5 have a void 4, within which portions of the liquid phase of the dispersion 3 are enclosed. The size of the vesicles 5 and thus of the voids 4 can be adjusted by means of the constraints, in particular by the choice of the molecules 7. Because of this circumstance, it is possible to form vesicles 5 from the dispersion which have an approximately identical, adjustable, known internal diameter, the void 4, enclosed by the sheath 6, of the vesicles 5 defining the maximum diameter of the subsequent grains 1 as they are shown in FIG. 6. For the purpose of preparing the vesicles 5, it is also possible to employ a so-called "French press", in particular with a design where the dispersion is forced, under high pressure, through a fine-pore filter.

After the vesicles 5 have been formed, the intermediate ions are removed from the liquid phase of the dispersion 3 by means of an ion exchange column. In spite of the concentration gradient (high concentration of intermediate ions within the voids 4 of the vesicles 5 and negligible to zero concentration of intermediate ions outside the voids 4) which is established as a result and promotes diffusion, the cationic intermediate ions remain within the voids 4 during this process, as they cannot penetrate the sheath 6, which takes the form of a bilayer membrane. After the intermediate ions have been removed outside the voids 4, the liquid phase of the dispersion 3 is admixed with anions, which penetrate the sheath 6 of the vesicles 5 and, after diffusion has taken place, react in the respective voids 4 of the vesicles 5 with the intermediate ions located therein. The product of this reaction is the intermediate of the varistor material (see FIG. 5), which subsequently still has to be converted into the varistor material. Such intermediates may, for example, be hydroxides, which are then converted into oxides by suitable and known processes such as calcining or the like.

Ideally, the conversion of the intermediate into the varistor material is carried out at the same time as the removal of the sheath 6 of the vesicle 5, said removal usefully being effected thermally. During the process of thermal removal, the temperature is adjusted, to this end, in such a way that, simultaneously with the removal of the sheath 6 of a vesicle 5, the intermediate situated in the void 4 is calcined and only a grain 1 of the varistor material remains.

The sheaths 6 of the vesicles 5 can also be removed gently, in particular by a suitable solvent. This has the advantage, in particular, that the molecules 7 can then be reused.

The grains 1 produced in this manner are similar to one another, within the above-mentioned limits.

For the purpose of shaping the protective element 2, the grains 1 are transferred to a mould and, depending on the shape of the protective element 2, are bonded to one another. A further possibility is to sinter the grains 1 in a mould. Sintering has the advantage, in this case, that owing to the thermal influence it is possible to remove impurities during sintering. In particular, the thermal action during sintering can at the same time be utilized to convert the intermediate into the varistor material.

The combination of salts employed advisably comprises readily soluble salts for the preparation of the salt-like dispersion 3. Irradiation or insonification advantageously takes place in the region of 20 kHz, while the sound intensity may be so low as to be virtually impossible to measure. The precipitate is produced by precipitation of the dispersion 3, which after formation of the vesicles 5 is present in the void 4, with a solution of an anion which forms a sparingly soluble precipitate with the intermediate ion.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for fabricating grains of varistor material, comprising:

forming a dispersion from a solvent and amphiphilic organic molecules;

dissolving a salt in said solvent, thereby producing intermediate ions that are cations of an intermediate of the varistor material;

forming a plurality of biochemical hollow bodies, each body having a void surrounded by an external sheath within which a portion of the dispersion and dissolved salt are enclosed;

removing the intermediate ions outside the biochemical hollow bodies from the dispersion;

admixing the dispersion with anions that permeate through the sheaths, thereby precipitating grains of the intermediate of the varistor material;

removing the sheaths; and calcining the intermediate to yield the varistor material comprising granules having a mean diameter of less than 1 $\mu$m, wherein more than 60% of the granules vary from the mean diameter by at most 40%.

2. A process according to claim 1, wherein removing the intermediate ions is by an ion-exchange column.

3. A process according to claim 1, wherein the calcining is carried out at the same time as the removal of the sheaths.

4. A process according to claim 1, wherein said forming biochemical hollow bodies comprises sonification of the dispersion containing the dissolved salt with ultrasound.

5. A process according to claim 1, wherein the amphiphilic organic molecules are selected from the group consisting of lipids and proteins.

6. A process according to claim 1, wherein the amphiphilic organic molecules are phospholipids.

7. A process according to claim 1, further comprising adjusting the dispersion to a pH different from 7.

8. A process according to claim 1, wherein the concentration of the dispersion admixed with the salt is greater than 0.1 M.

9. A process according to claim 1, wherein the dispersion is saturated with the salt.

10. A process according to claim 1, wherein the biochemical hollow bodies are selected from the group consisting of micelles, microemulsions, ferritin and vesicles.

11. A process according to claim 1, wherein after formation of the intermediate, the sheaths of the hollow bodies are removed thermally or by treating with a solvent.

* * * * *